US005633110A

United States Patent [19]

Desie et al.

[11] Patent Number: 5,633,110

[45] Date of Patent: May 27, 1997

[54] DRY TONER FOR DIRECT ELECTROSTATIC PRINTING (DEP)

[75] Inventors: Guido Desie, Herent; Serge Tavernier, Lint, both of Belgium

[73] Assignee: Agfa-Gevaert N.V., Mortsel, Belgium

[21] Appl. No.: 554,857

[22] Filed: Nov. 7, 1995

[30] Foreign Application Priority Data

Nov. 29, 1994 [EP] European Pat. Off. .............. 94203464

[51] Int. Cl.$^6$ .......................... G03G 15/06; G01D 15/06

[52] U.S. Cl. .............................................. 430/120; 347/55

[58] Field of Search .................................... 430/106, 107, 430/111, 120; 346/159

[56] References Cited

U.S. PATENT DOCUMENTS

| | | | |
|---|---|---|---|
| 3,939,087 | 2/1976 | Vijayendran | 430/115 |
| 5,158,851 | 10/1992 | Fuller et al. | 430/106 |
| 5,257,046 | 10/1993 | Schmidlin | 346/159 |
| 5,328,792 | 7/1994 | Shigemori et al. | 430/111 |

*Primary Examiner*—John Goodrow

*Attorney, Agent, or Firm*—Brumbaugh, Graves, Donohue & Raymond

[57] ABSTRACT

A method for direct electrostatic printing (DEP) on an intermediate substrate or on a final substrate is provided, using a device that comprises a back electrode (105), a printhead structure (106) comprising a control electrode in combination with apertures (107), and a toner delivery means (101) presenting a cloud (104) of dry toner particles in the vicinity of said apertures (107), characterised in that (i) the toner particles have as topological criterium that the ratio of the length of the long axis of the projected microscopic image of said particles to the length of the short axis, is between 1.00 and 1.40 and (ii) the toner particles after addition of 0.5% by weight of fumed hydrophobic silica having a specific surface area of 260 $m^2/g$ show a ratio of apparent density ($\rho_{app}$) over real density ($\rho_{real}$)

$$\frac{\rho_{app}}{\rho_{real}} > 0.52$$

7 Claims, 1 Drawing Sheet

DRY TONER FOR DIRECT ELECTROSTATIC PRINTING (DEP)

DESCRIPTION

1. Field of the Invention

Figure 1:
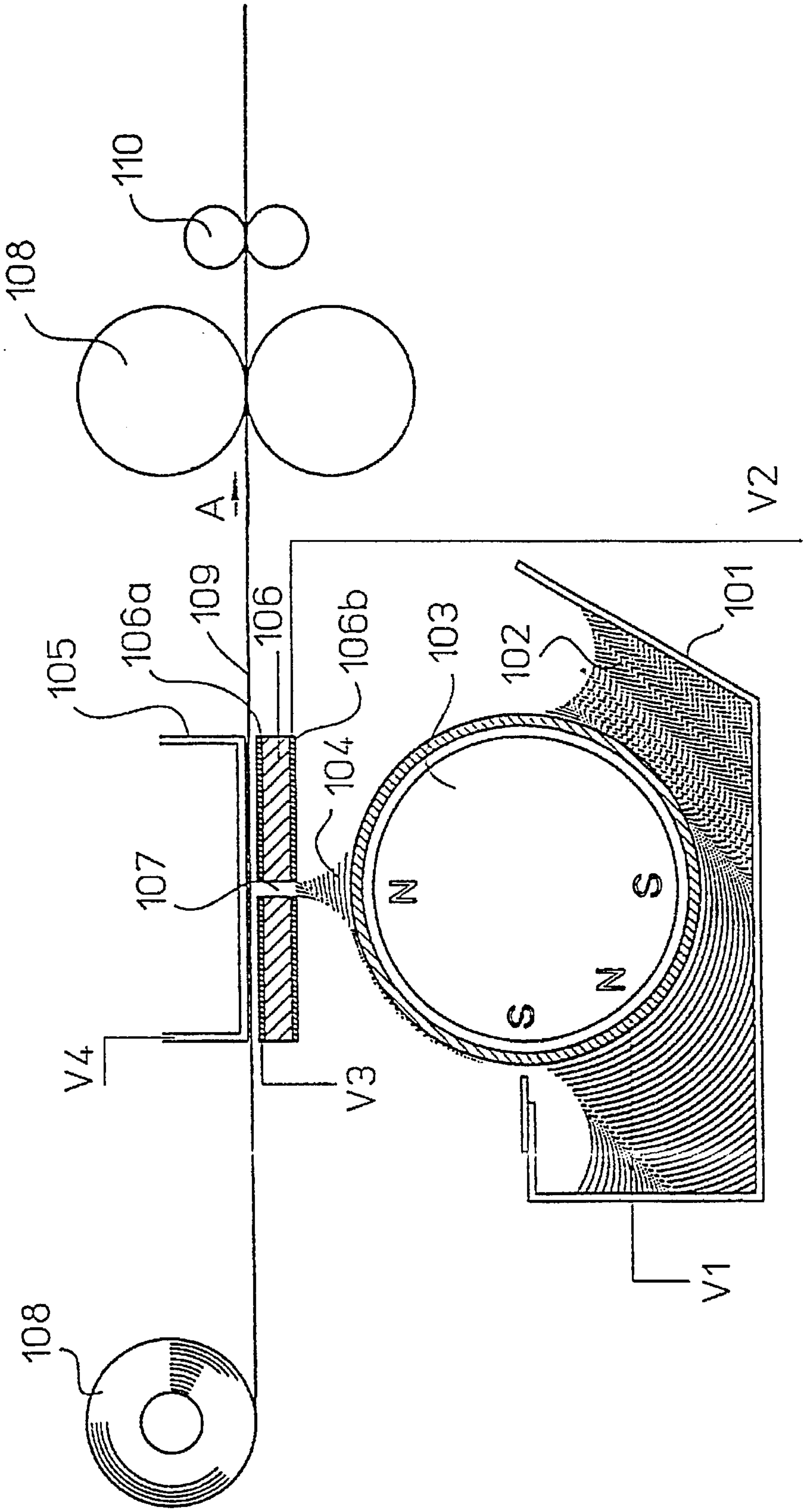

This invention relates to a dry toner used in the process of electrostatic printing and more particularly in Direct Electrostatic Printing (DEP). In DEP electrostatic printing is performed directly on a substrate by means of electronically addressable printheads and the toner has to fly in an imagewise manner towards the receiving substrate.

2. Background of the Invention

In DEP (Direct Electrostatic Printing) the toner or developing material is deposited directly in an imagewise way on a substrate, the latter not bearing any imagewise latent electrostatic image. The substrate can be an intermediate, in case it is preferred to transfer said formed image on another substrate (e.g. aluminum, etc . . . ), but it is preferentially the final receptor, thus offering a possibility to create directly the image on the final receptor, e.g. plain paper, transparency, etc. . . . after a final fusing step. This makes the method different from classical electrography, in which a latent electrostatic image on a charge retentive surface is developed by a suitable material to make the latent image visible and in which either the powder image is fused directly to said charge rentential surface, which then results in a direct electrographic print, or in which the powder image is subsequently transferred to the final substrate and then fused to that medium, the latter proces resulting in a indirect electrographic print. The final substrate can be different materials, such as a transparent medium, opaque polymeric films, paper, etc. . . .

DEP is also markedly different from electrophotography in which an additionnal step and additionnal member is introduced to create the latent electrostatic image, more specifically, a photoconductor is used and a charging/exposure cycle is necessary.

A DEP device is disclosed in U.S. Pat. No. 3,689,935. This document discloses an electrostatic line printer comprising a multilayered particle modulator or printhead comprising a layer of insulating material, a continuous layer of conductive material on one side of the layer of the insulating material and a segmented layer of conductive material on the other side of the layer of the insulating material. The printhead comprises also at least one row of apertures. Each segment of the segmented layer of conductive material is formed around a portion of an aperture and is insulatively isolated from each other segment of the segmented conductive layer. Selected potentials are applied to each of the segments of the segmented conductive layer while a fixed potential is applied to the continuous conductive layer. An overall applied propulsion field projects charged particles through a row of apertures of the particle modulator (printhead) and the intensity of the particle stream is modulated according to the pattern of potentials applied to the segments of the segmented conductive layer. The modulated stream of charged particles impinges upon a print-receiving medium interposed in the modulated particle stream and translated in a direction relative to the particle modulator (printhead) to provide a line-by-line scan printing. The segmented electrode is called the control electrode and the continuous electrode is called the shield electrode. The shield electrode faces, e.g., the toner supply and the control electrode faces the image recording member. A DC field is applied between the printhead and a backing electrode and this propulsion field is responsible for the attraction of toner to the imaging receiving member that is placed between the printhead and the backing electrode.

This kind of printing engine, however, does not produce stable results with high precision for a long writing time, since the apertures in the printhead become too easily blocked (clogged) by toner particles adhering to the insulating material or shield and control electrodes.

To overcome these problems several modifications have been proposed in the literature.

In U.S. Pat. No. 4,478,510 e.g. a spark discharge is used to remove toner particles adhered to the printhead, in order to set if free again. For that purpose the printing time is divided in a writing time (during which an image is written to the receiving material) and a cleaning time. During the cleaning period the voltage applied to the back electrode is enhanced so that a spark discharge occurs from printhead to back electrode. Toner particles adhered to the printhead become dislodged and are gathered upon the back electrode. Another possibility that has been described is a spark discharge between shield and control electrode providing the same effect, namely cleaning of clogged printhead apertures.

In U.S. Pat. No. 4,755,837 an AC voltage is used for the backing electrode during the cleaning cycle. In a preferred embodiment the AC voltage on the back electrode is phase shifted by 180° if compared with the AC that is used upon the charged toner conveyor which is needed to obtain a high toner mist production, leading to high optical densities and short printing times. Furtheron the AC voltage can also have a certain DC-offset.

In U.S. Pat. No. 4,876,561 clogging of the printhead is prevented by making the apertures large enough and/or the thickness of the isolating layer small enough.

In U.S. Pat. No. 4,903,050 an AC voltage is applied to the back electrode as in UP P 4,755,857, but a shutter and vacuum system is added in order to prevent the dislodged toner to fall onto the receiving member. In U.S. Pat. No. 5,095,322 clogging of the apertures is prevented by applying to the shield electrode a pulsed DC-voltage which is 180° out of phase if compared with the AC-voltage applied to the charged toner conveyor. In an other embodiment a DC-biased AC voltage with the same frequency as the AC voltage applied to the charged toner conveyor but 180° out of phase is used to prevent clogging of the apertures in the apertured printhead.

In U.S. Pat. No. 5,153,611 an ultrasonic vibration is applied to the apertured printhead, yielding a better performance regarding prevention of clogging of the apertures.

The same idea has also been described in U.S. Pat. No. 5,202,704.

In U.S. Pat. No. 5,233,392 a better performance in preventing clogging of the apertures is disclosed by using an ultrasonic vibration applied to the printhead, the improvement being changing within the writing time for each individual pixel the resonant frequency of the oscillation used by a small amount, resulting in a much better prevention of clogging.

In U.S. Pat. No. 5,283,594 the level of vibration applied to the printhead is different during writing time and cleaning time. During writing time the oscillation is large enough to prevent clogging of the apertures for a great amount, during cleaning time the amplitude of the oscillating vibration is large enough to dislodge the toner particles that have partially clogged the apertures during the writing cycle. As a result the long-time performance of the DEP-apparatus is improved considerably.

In U.S. Pat. No. 5,293,181 the printhead is vibrated in such a way that a mechanical vibrational propagating wave is created. The printhead also has a provision in order to prevent relection of the mechanical vibrational propagating wave. Using these implementations a good long-time stability without clogging of the apertures is provided with a good writing characteristic.

In U.S. Pat. No. 5,307,092 an antistatic coating is applied to the electrodes in the printhead so that any tribocharge that accumulates during writing can be grounded. As a result the netto tribo charge on the printhead (which is unwanted and is responsible for unpredictable results and clogging) is removed and a better long-time performance results.

In WO 90/14959 the printhead is treated with pressurized air or vacuum so that the individual toner particles do not adhere to the printhead for such a large amount if compared with a printing engine not using the air treatment. In the same document an additional improvement is described where by the magnetic toner particles are removed from the printhead by using a much stronger magnetic field during the cleaning cycle than during the writing cycle.

DE 43 38 991 discloses the use of ionised air for blowing over the printhead so that the electrostatic interaction of the toner particles with the printhead is reduced and the toner particles are removed more easily.

All these patent applications mentioned above do make the configuration of the DEP-device quite complicated.

It would thus be interesting if the toner particles used could be adapted for the DEP-printing so that a simple DEP device can be used without cumbersome and expensive modifications.

In Japanese patent application JP 05158275 it is disclosed to coat the toner particles with ultrafine particles of one or more metal oxides fixed to the surface of the toner. Although toner particles prepared according to this disclosure can prevent clogging to a certain extent, it is not so easy to stably fix said metal oxide particles onto the toner particles nor is it easy to perform prolonged printing without additional cleaning steps.

There is thus still a need to have toner particles for use in DEP printing, that can be prepared in an easy and reproducible way and the use of which overcomes the problems cited above.

3. Objects of the Invention

It is an object of the invention to provide an improved toner for use in the method for Direct Electrostatic Printing (DEP) that makes it possible to print high quality images in large edition without the need for cleaning the printhead structure.

It is another object of the invention to provide a device in which the method above can be executed.

Further objects and advantages of the invention will become clear from the description hereinafter.

The above objects are realized by providing a toner for use in the method of direct electrostatic printing (DEP) on an intermediate substrate or on a final substrate, using a device that comprises a back electrode (105), a printhead structure (106) comprising a control electrode in combination with apertures (107), and a toner delivery means (101) presenting a cloud (104) of toner particles in the vicinity of said apertures (107), characterised in that (i) said toner particles have as topological criterium that the ratio of the length of the long axis of the projected microscopic image of said particles to the length of the short axis, measured according to TEST B, described hereinafter, is between 1.00 and 1.40 and (ii) said toner particles after addition of 0.5% by weight of fumed hydrophobic silica having a specific surface area of 260 $m^2/g$ show a ratio of apparent density ($\rho_{app}$) over real density ($\rho_{real}$)

$$\frac{\rho_{app}}{\rho_{real}} > 0.52$$

In a preferred embodiment the ratio of the length of the long axis of the projected microscopic image of said particles to the length of the short axis is between 1.00 and 1.30 and said ratio of apparent density ($\rho_{app}$) over real density ($\rho_{real}$) is greater than 0.55.

In an other preferred embodiment the ratio between the measured BET ($BET_{meas}$) of the toner particles to the calculated BET ($BET_{calc}$) of the toner particles fulfils the equation $$1.00 \leqq \frac{BET_{meas}}{BET_{calc}} \leqq 2.00$$

In a further preferred embodiment, said toner particles used in the method of the present invention, have a average charge per volume diameter (q/d) expressed in fC/10 μm such that 1 fC/10 μm$\leqq|q/d|\leqq$20 fC/10 μm, more preferably such that 1 fC/10 μm$\leqq|q/d|\leqq$10 fC/10 μm.

In an other preferred embodiment, said toner particles used in the method of the present invention, have a charge distribution with a coefficient of variability, v, lower than 0.5, preferably lower than 0.33.

In an other preferred embodiment, said toner particles used in the method of the present invention, have an volume average particle diameter in the range of 3 to 20 μm, with a coefficient of variability lower than 0.5, preferably lower than 0.33.

In an other preferred embodiment, said toner particles are used in a DEP-device using a two-component development system.

4. Brief Description of the Drawings FIG. 1 is a schematic illustration of a possible embodiment of a DEP device for using toner particles according to the present invention.

5. Detailed Description of the Invention

The modifications of the principle of DEP (Direct Electrographic Printing) have hitherto been adressed to the mechanical or electric parts of the devices, but little attention has been paid to the composition and/or shape of the marking material, which will be called hereinafter the developer. It has been found that when a single-component developer (i.e. comprising only marking toner particles) or a multi-component developer (i.e. comprising at least carrier particles and marking toner particles) is used, a significant improvement in DEP can be obtained by proper adaptation of the toner particles used.

For conventional electrophotography it is not evident that toner particles resulting from new ways of synthesis, such as e.g. the polymerisation technique, giving rounded toner particles, lead to much better results than the irregularly shaped toner particles mostly in use. However, spheroidal toner particles, for conventional electrostatography are described and can be obtained by different fabrication processes. Spheroidization may e.g. proceed by spray-drying or the heat-dispersion process disclosed in U.S. Pat. No. 4,345,015. Other methods for spheroidisation of toner particles have been described in EP-A 255 716, DE-OS 4,037,518 and U.S. Pat. No. 4,996,126.

Contrary to classical electrostatography, in DEP, it has been found however, that one of the main problems, namely clogging of the apertures, can be prevented to a great extent by using toner particles with an appropriate shape and resultant rheological behaviour, especially if the DEP printhead structure designed for high resolution and image quality, shows small printing apertures.

It was found that toner particles (i) having as topological criterium that the ratio of the length of the long axis of the projected microscopic image of said particles to the length of the short axis is between 1.00 and 1.40 and (ii) showing, after addition of 0.5% by weight of fumed hydrophobic silica having a specific surface area of 260 $m^2/g$, a ratio of apparent density ($\rho_{app}$) over real density ($\rho_{real}$) greater than 0.52 make it possible to run a DEP device for a longer time without clogging of the printhead apertures than is possible when running the DEP device with toner particles of irregular shape.

In a more preferred embodiment, the ratio of the length of the long axis of the projected microscopic image of said particles to the length of the short axis is between 1.00 and 1.30.

It is further preferred that the ratio of apparent density ($\rho_{app}$) over real density ($\rho_{real}$) greater than 0.55.

In a most preferred embodiment the ratio of the length of the long axis of the projected microscopic image of said particles to the length of the short axis is between 1.00 and 1.25, and the fluididity, as defined above, is higher than 60 mg/sec.

Toner particles, showing moreover a specified ratio between measured BET ($BET_{meas}$) to calculated BET ($BET_{calc}$) are even more preferred for use in a DEP method according to the present invention (BET is expressed in $m^2/g$). The calculated BET ($BET_{calc}$) is determined by 3/ρ.r, wherein ρ is taken 1.25 (specific gravity of the toner particles) and r is the numerical average diameter of the toner particles divided by 2, when measured with a COULTER COUNTER (registered trade mark) Model TA II particle size analyzer operating according to the principles of electrolyt displacement in narrow aperture and marketed by COULTER ELECTRONICS Corp. Northwell Drive, Luton, Bedfordshire, LC 33, UK.

In a preferred embodiment the ratio, mentioned above, fulfils the equation $$1.00 \leqq \frac{BET_{meas}}{BET_{calc}} \leqq 2.00$$

Furtheron, the toner particles according to the present invention have preferably an average volume diameter ($D_{v,50}$) between 3 and 20 μm, more preferably between 5 and 10 μm. The volume particle size distribution of said toner particles is basically gaussian with a coefficient of variability, v, lower than 0.50, preferably lower than 0.33. The coefficient of variability equals the standard deviation of the particle size distribution divided by the average of the size distribution. The particle size distribution is measured with a COULTER COUNTER (registered trade mark) Model TA II particle size analyzer operating according to the principles of electrolyt displacement in narrow aperture and marketed by COULTER ELECTRONICS Corp. Northwell Drive, Luton, Bedfordshire, LC 33, UK.

Preferably the toner particles, to be used in a preferred embodiment of the present invention, will acquire, upon triboelectric contact with the carrier particles, a charge per volume diameter (q/d), expressed in fC (femtoCoulomb)/10 μm and that can be either negative or positive, such that the absolute value of the charge |q/d| fulfils the equation 1 fC/10 μm≦|q/d|≦20 fC/10 μm, more preferably such that 1 fC/10 μm≦|q/d|≦10 fC/10 μm.

Preferably said toner particles have a charge distribution with a coefficient of variability, v, lower than 0.5, more preferably lower than 0.33.

It is possible to have fairly low charged toner particles and avoid wrong sign toner by having toner particles with very homogeneous charge distribution. The charge distribution is measured with an apparatus, sold by Dr. R. Epping PES-Laboratorium D-8056 Neufahrn, Germany under the name "q-meter". The q-meter is used to measure the distribution of the toner particle charge (q in fC) with respect to a measured toner diameter (d in 10 μm). The measurement result is expressed as percentage particle frequency (in ordinate) of same q/d ratio on q/d ratio expressed as fC/10 μm (in abscissa). The measurement is based on the different electrostatic deflection according to their q/d ratio of triboelectrically charged toner particles making part of a bunch of toner particles carried by a laminar air flow in a long narrow tube. From the median |q/d| value, the average absolute charge of the toner particles is calculated by $$|q| = \frac{|q/d| \times d_{v,50}}{10},$$

wherein $d_{v,50}$ is expressed in μm

For more detailed information how to operate said "q-meter" reference is made to its operation manual of March 1988.

Toner compositions showing a narrow charge distribution and the operation of the "q-meter", mentioned above, are disclosed in European Application 93201644.7 filed on Jun. 6, 1993, European Application 93201352.7. filed on May 11, 1993 and European Application 93201351.9 filed on May 11, 1993; these application are incorporated by reference.

Toner particles, according to the present invention, can comprise any of the conventional toner ingredients e.g. charge control agents, pigments both coloured and black, dyes, anorganic fillers, etc. A description of charge control agents, pigments, dyes and other additives useful in toner particles, according to the present invention, can be found in e.g. EP-A 601 235.

When toners, according to the present invention are designed for use in black-and-white copying the toners can comprise an inorganic pigment which is preferably carbon black, but is likewise e.g. black iron (III) oxide. Inorganic coloured pigments are e.g. copper (II) oxide and chromium (III) oxide powder, milori blue, ultramarine cobaltblue and barium permanganate.

Examples of carbon black are lamp black, channel black and furnace black e.g. SPEZIALSCHWARZ IV (trade name of Degussa Frankfurt/M - Germany) and VULCAN XC 72 and CABOT REGAL 400 (trade names of Cabot Corp. High Street 125, Boston, U.S.A.).

The toners according to the present invention may contain organic dyes or pigments of the group of phthalocyanine dyes, quinacridone dyes, triaryl methane dyes, sulphur dyes, acridine dyes, azo dyes and fluoresceine dyes. A review of these dyes can be found in "Organic Chemistry" by Paul Karrer, Elsevier Publishing Company, Inc. New York, U.S.A (1950).

Likewise may be used the dyestuffs described in the following published European patent applications (EP-A) 0 384 040, 0 393 252, 0 400 706, 0 384 990, and 0 394 563.

Examples of particularly suited organic dyes are listed according to their colour yellow, magenta or cyan and are identified by name and Colour Index number (C.I. number) in the following Table 1 which also refers to the manufacturer.

TABLE 1

| | Colour Index 1 and 2 | | Manufacturer |
|---|---|---|---|
| Yellow dye | | | |
| Permanent Yellow GR | PY 13 | 21100 | Hoechst AG |
| Permanent Yellow GG02 | PY 17 | 21105 | Hoechst AG |
| Novoperm Yellow FGL | PY 97 | 11767 | Hoechst AG |
| Permanent Yellow GGR | PY 106 | | Hoechst AG |
| Permanent Yellow GRY80 | PY 174 | | Hoechst AG |
| Sicoechtgelb D1155 | PY 185 | | BASF |
| Sicoechtgelb D1350DD | PY 13 | 21100 | BASF |
| Sicoechtgelb D1351 | PY 13 | 21100 | BASF |
| Sicoechtgelb D1355DD | PY 13 | 21100 | BASF |
| Magenta dye | | | |
| Permanent Rubin LGB | PR57:1 | 15850:1 | Hoechst AG |
| Hostaperm Pink E | PR122 | 73915 | Hoechst AG |
| Permanent Rubin E02 | PR122 | 73915 | Hoechst AG |
| Permanent Carmijn FBB02 | PR146 | 12433 | Hoechst AG |
| Lithol Rubin D4560 | PR57:1 | 15850:1 | BASF |
| Lithol Rubin D4580 | PR57:1 | 15850:1 | BASF |
| Lithol Rubin D4650 | PR57:1 | 15850:1 | BASF |
| Fanal Rosa D4830 | PR81 | 45160:1 | BASF |
| Cyan dye | | | |
| Hostaperm Blue B26B | PB15:3 | 74160 1 | Hoechst AG |
| Heliogen Blau D7070DD | PR15:3 | 74160 | BASF |
| Heliogen Blau D7072DD | PR15:3 | 74160 | BASF |
| Heliogen Blau D7084DD | PR15:3 | 74160 | BASF |
| Heliogen Blau D7086DD | PR15:3 | 74160 | BASF |

In order to obtain toner particles with sufficient optical density in the spectral absorption region of the colorant, the colorant is preferably present therein in an amount of at least 1% by weight with respect to the total toner composition, more preferably in an amount of 1 to 10% by weight.

In order to modify or improve the triboelectric chargeability in either negative or positive direction the toner particles, according to the present invention may contain (a) charge control agent(s). For example, in published German patent application (DE-OS) 3,022,333 charge control agents for yielding negatively chargeable toners are described. In DE-OS 2,362,410 and U.S. Pat. Nos. 4,263,389 and 4,264,702 charge control agents for positive chargeability are described. Very useful charge controlling agents for providing a net positive charge to the toner particles are described in U.S. Pat. No. 4,525,445, more particularly BONTRON NO4 (trade name of Oriental Chemical Industries—Japan) being a nigrosine dye base neutralized with acid to form a nigrosine salt, which is used e.g. in an amount up to 5% by weight with respect to the toner particle composition. A charge control agent suitable for use in colourless or coloured toner particles is zinc benzoate and reference therefor is made to EP-A 463 876 decribing zinc benzoate compounds as charge controlling agents. Such charge controlling agent may be present in an amount up to 5% by weight with respect to the toner particle composition.

Description of the DEP Device

A non limitative example of a device for implementing a DEP method using toner particles according to the present invention comprises (FIG. 1):

(i) a toner delivery means (101), comprising a container for developer (102) and a magnetic brush assembly (103), this magnetic brush assembly forming a toner cloud (104)

(ii) a back electrode (105)

(iii) a printhead structure (106), made from a plastic insulating film, coated on both sides with a metallic film. The printhead structure (106) comprises one continuous electrode surface, hereinafter called "shield electrode" (**106*b*) facing in the shown embodiment the toner delivering means and a complex addressable electrode structure, hereinafter called "control electrode" (106*a*) around printing apertures (107), facing, in the shown embodiment, the toner-receiving member in said DEP device. The location and/or form of the shield electrode (106*b*) and the control electrode (106*a***) can, in other embodiments of a device for a DEP method using toner particles according to the present invention, be different from the location shown in FIG. 1.

(iv) conveyer means (108) to convey an image receptive member (109) for said toner between said printhead structure and said back electrode in the direction indicated by arrow A.

(v) means for fixing (110) said toner onto said image receptive member.

Although in FIG. 1 an embodiment of a device for a DEP method using two electrodes (**106*a* and 106*b*) on printhead 106 is shown, it is possible to implement a DEP method, using toner particles according to the present invention using devices with different constructions of the printhead (106**). It is, e.g. possible to implement a DEP method with a device having a printhead comprising only one electrode structure as well as with a device having a printhead comprising more than two electrode structures. The apertures in these printhead structures can have a constant diameter, or can have a broader entrance or exit diameter. The DEP method, using toner particles according to the present invention can also be implemented by using a DEP device comprising an electrode mesh array as printhead structure made from isolated woven wires, as disclosed in e.g. U.S. Pat. No. 5,121,144.

The back electrode of this DEP device can also be made to cooperate with the printhead structure, said back electrode being constructed from different styli or wires that are galvanically isolated and connected to a voltage source as disclosed in e.g. U.S. Pat. No. 4,568,955 and U.S. Pat. No. 4,733,256. The back electrode, cooperating with the printhead structure, can also comprise one or more flexible PCB's (Printed Circuit Board).

Between said printhead structure (106) and the magnetic brush assembly (103) as well as between the control electrode around the apertures (107) and the back electrode (105) behind the toner receiving member (109) as well as on the single electrode surface or between the plural electrode surfaces of said printhead structure (106) different electrical fields are applied. In the specific embodiment of a device, useful for a DEP method, using toner particles according to the present invention, shown in FIG. 1. voltage V1 is applied to the sleeve of the magnetic brush assembly 103, voltage V2 to the shield electrode **106*b*, voltages $V3_0$ up to $V3_n$ for the control electrode (106*a***). The value of V3 is selected, according to the modulation of the image forming signals, between the values $V3_0$ and $V3_n$, on a timebasis or gray-level basis. Voltage V4 is applied to the back electrode behind the toner receiving member. In other embodiments of the present invention multiple voltages $V2_0$ to $V2_n$ and/or $V4_0$ to $V4_n$ can be used.

Toner particles according to the present invention, can be used in any DEP device.

The toner particles according to the present invention can beneficially be used in a DEP device wherein the toner delivery means (101) is a flexible belt, called Charged Toner Conveyor (CTC). On said belt an homogeneous layer of toner particles is applied either from a monocomponent or a multicomponent developer. The use of a CTC is e.g. described in U.S. Pat. No. 4,491,855 and U.S. Pat. No. 4,814,796. Said CTC can be flexible or rigid, and the toner particles can be moved to the vicinity of the printing apertures (107) by electrostatic travelling wave patterns as described in, e.g. U.S. Pat. No. 4,568,955. Said CTC can also be double, one free running and one attached to the printhead (106), as described in e.g. U.S. Pat. No. 4,780,733. Also in a DEP device wherein said toner delivery means is a brush with polymeric ciliary members. In such a device the vibration of the ciliary members by a doctoring blade generates the toner cloud (104) and a voltage applied to said doctoring blade gives a high charge on the toner particles. Such a device is described in, e.g., U.S. Pat. No. 5,099,271 and U.S. Pat. No. 5,128,695.

Toner particles, according to the present invention, can also be used in a DEP device, wherein the toner delivery means is a sponge roller as described in U.S. Pat. No. 5,153,611. Toner particles, according to the present invention, can as well be used in a DEP device wherein the CTC is in frictional contact with the printhead structure, and wherein CTC and printhead structure are provided with an abrasion resistant surface coating as described in, e.g. EP-A 587 366.

It is preferred to use toner particles according to the present invention, in a DEP device wherein (i) a multi-component developer is used comprising at least toning particles (toner particles) and magnetic attractable carrier particles and (ii) said toner delivery means (101) is a magnetic brush assembly (103) and said toner cloud (104) is generated directly from said multi-component developer present at the surface of said magnetic brush assembly and (iii) said toner cloud (104) is (preferentially) generated by an oscillating field.

When the toner particles according to the present invention are used in a device as mentioned above, it is preferred that the reference surface of said magnetic brush assembly is placed at a distance (1) in μm from the surface of the printhead structure facing said magnetic brush assembly, wherein 1 fulfils the condition:

$$\frac{2}{3}L<1<1000+L$$

wherein L is defined as the maximum thickness in μm of the developer layer on said magnetic brush assembly in the absence of said oscillating field. "Reference surface of said magnetic brush assembly" means the outer surface of the magnetic brush assembly when no developer is present on said outer surface.

Such a device is disclosed in European Application 94201026.5 filed on Apr. 14, 1994, wherein also a measurement method for L is given. This disclosure is incorporated by reference.

However, also a monocomponent developer can be used and transported in the vicinity of the apertures via a charged toner conveyor as a moving belt or via a fixed belt using an electrode structure with corresponding electrostatic travelling wave pattern moving the toner particles.

The back electrode, the printhead structure, the conveying means for the image receptive member and the fixing means in a DEP device according to the present invention can be constructed in any suitable way, as disclosed in, e.g., U.S. Pat. No. 3,689,935, GB 2,108,432, DE-OS 3,411,948, EP-A 266 960, U.S. Pat. No. 4,743,926, U.S. Pat. No. 4,912,489, U.S. Pat. No. 5,038,322, U.S. Pat. No. 5,202,704 etc.

The magnetic brush assembly to be used in a DEP device according to a preferred embodiment of the present invention can be either of the type with stationary core and rotating sleeve or of the type with rotating core and rotating or stationary sleeve.

For use with a stationary core/rotating sleeve type magnetic brush the carrier particles are preferably "soft" magnetic particles, characterised with a coercivity value ranging from about 50 up to 250 Oe, said carrier particles being rather homogeneous ferrite particles (ferrites of the soft type) or composite magnetic particles. Ferrites can be represented by the general formula:

$$MeO.Fe_2O_3$$

wherein Me denotes at least one divalent metal such as $Mn^{2+}$, $Ni^{2+}$, $Co^{2+}$, $Mg^{2+}$, $Ca^{2+}$, $Zn^{2+}$, and $Cd^{2+}$, furtheron doped with monovalent or trivalent ions. As a special case $FeO.FeO_3$, magnetite, can be mentioned.

As soft magnetic carrier particles it is preferred to use composite carrier particles, comprising a resin binder and a mixture of two magnetites having a different particle size as described in EP-B 289 663, that is incorporated by reference. The particle size of both magnetites will vary between 0.05 and 3 μm.

For the rotating core/rotating or stationary sleeve type magnetic brush the carrier particles are preferably "hard" magnetic particles.

Here again homoparticles as well as composite particles can be used. The homoparticles are preferably hard ferrite macroparticles. By hard magnetic macroparticles are understood particles with a coercivity of at least 250 Oe, most preferably 1000 Oe, when magnetically saturated, the magnetisation being at least preferably 20 emu/g of carrier material. Useful hard magnetic materials include hard ferrites and gamma ferric oxide. The hard ferrites are represented by a similar composition as cited above, whereby specific ions such as $Ba^{2+}$, $Pb^{2+}$, or $Sr^{2+}$ are used as disclosed in U.S. Pat. No. 3,716,630.

However, it is preferred to use composite particles as they give a lower specific gravity and are more flexible in design. In this case the hard magnetic particles are present in a fine form, called pigment, but are essentially of the same chemical composition.

The hard magnetic pigments then show a coercivity of at least 250 Oe, preferably at least 1000 Oe, and more preferably at least 3000 Oe. In this regard, while magnetic materials having coercivity levels of 3000 and 6000 Oersted have been found useful, there appears to be no theoretical reason why higher coercivity levels would not be useful.

Also composite carrier comprising a binder resin and a mixture of both "soft" and "hard" magnetic particles can be used as the "hard" magnetic carrier to be used in combination with toner particles according to the present invention. Such composite carrier materials are disclosed in U.S. Pat. No. 5,336,580, that is incorporated by reference.

The typical particle size of the carrier particles to be used in combination with toner particles according to the present invention, can be choosen over a broad range.

It has been found most favourable to use a particle size in the range of 20 to 200 μm more specifically in the range of 40 to 150 μm. The diameter refers to the typical volume average particle diameter of the carrier beads, as it may be determinated by sieving techniques. The carrier beads can be used as such, i.e. uncoated, or they may be coated with inorganic as well as organic or mixed coatings. Typical coating thickness is in the range of 0.5 to 2.5 μm. The coating may be used to induce different properties such as for example triboelectrical charging, friction reduction, wear resistance, etc. . . .

Developer Composition

Toner particles and carrier particles, as described above are finally combined to give a high quality electrostatic developer. This combination is made by mixing said toner and carrier particles in a ratio weight by weight (w/w) of 1.5/100 to 20/100, preferably in a ratio (w/w) of 3/100 to 10/100.

To enhance the flowability of the developer composition, according to the present invention, it is possible to mix toner particles, according to the present invention, with flow improving additives. These flow improving additives are preferably extremely finely divided inorganic or organic materials the primary (i.e. non-clustered) particle size of which is less than 50 nm. Widely used in this context are fumed inorganics of the metal oxide class, e.g. selected from the group consisting of silica ($SiO_2$), alumina ($Al_2O_3$), zirconium oxide and titanium dioxide or mixed oxides thereof which have a hydrophilic or hydrophobized surface.

The fumed metal oxide particles have a smooth, substantially spherical surface and are preferably coated with a hydrophobic layer, e.g. formed by alkylation or by treatment with organic fluorine compounds. Their specific surface area is preferably in the range of 40 to 400 $m^2/g$.

In preferred embodiments the proportions for fumed metal oxides such as silica ($SiO_2$) and alumina ($Al_2O_3$) are admixed externally with the finished toner particles in the range of 0.1 to 10% by weight with respect to the weight of the toner particles.

Fumed silica particles are commercially available under the tradenames AEROSIL and CAB-O-Sil being trade names of Degussa, Franfurt/M Germany and Cabot Corp. Oxides Division, Boston, Mass., U.S.A. respectively. For example, AEROSIL R972 (tradename) is used which is a fumed hydrophobic silica having a specific surface area of 110 $m^2/g$. The specific surface area can be measured by a method described by Nelsen and Eggertsen in "Determination of Surface Area Adsorption measurements by continuous Flow Method", Analytical Chemistry, Vol. 30, No. 9 (1958) p. 1387–1390.

In addition to the fumed metal oxide, a metal soap e.g. zinc stearate, as described in the United Kingdom Patent Specification No. 1,379,252, wherein also reference is made to the use of fluor containing polymer particles of sub-μm size as flow improving agents, may be present in the developer composition using toner particles, according to the present invention, in a DEP process.

The improved stability of the DEP process, using developer comprising toner particles according to the present invention makes it also possible to operate it in a reproducible way at higher resolution by the fact that obstruction of the jetting process even in smaller apertures is strongly reduced and even avoided.

The toner particles, according to the present invention, can equally well be used in DEP device running with a cleaning step in combination with a writing step. The use of toner particles according to the present invention, will have even in such device the advantage that the cleaning operations can be further spaced in time (longer uninterrupted printing) or that the demands on the quality and force of the cleaning devices are more easily and economically fulfilled. The cleaning procedures in DEP device, wherein toner particles according to this invention can beneficially be used are manifold. It can be that the voltage (V4) on the backelectrode is raised to extract all toner particles from the printing apertures, as disclosed in e.g. U.S. Pat. No. 4,478,510. The cleaning of the printing apertures can also proceed by applying an AC field to the shield electrode (**106*b*). When an AC voltage is applied to the toner delivery means to form the toner cloud (104), then the cleaning AC voltage applied to the shield electrode is preferably 180 degrees out of phase when compared to said AC voltage applied to the toner delivery means, as diclosed in e.g. U.S. Pat. No. 5,095,322. Instead of being applied to the shield electrode (106*b*) the cleaning AC-voltage can be applied to the backelectrode (105), also in this case, the cleaning AC voltage applied to the shield electrode is, when an AC voltage is applied to the toner delivery means to form the toner cloud (104**), preferably 180 degrees out of phase with said AC voltage applied to the toner delivery means as described in e.g. U.S. Pat. No. 4,755,837.

Toner particles, according to the present invention, are also very useful in DEP device were the cleaning step is a mechanical one: a brush (as in e.g. DE 43 38 992), vibration of the printhead structure either mechanical or ultrasonical as disclosed in e.g. U.S. Pat. No. 5,153,611, U.S. Pat. No. 5,202,704, U.S. Pat. No. 5,233,392, U.S. Pat. No. 5,283,594 and U.S. Pat. No. 5,293,181.

Toner particles, according to the present invention, are also very useful in DEP device were the cleaning is performed by presuurized air as in e.g. WO 90/14959 and DE 43 38 991, or by magnetic forces as disclosed in e.g. WO 90/14959.

This combinaton of the increased resolution and of the possibilities for multilevel half-toning techniques (by amplitude modulation of voltage V3, by time modulation of voltage V3, applied or by a combination of an amplitude modulation and a time modulation of the voltage V3, applied to said control electrode (**106*a***)) makes that a DEP process is able to give increased image quality images.

Dry developer, comprising toner particles according to the present invention, can be used either in a stand alone DEP device or in a DEP device combined within one apparatus together with a classical electrographic device, in which a latent electrostatic image on a charge retentive surface is developed by a suitable material to make the latent image visible. In such an apparatus the DEP device and the classical electrographic device are two different printing devices used to print both images with various gray levels and alphanumeric symbols and/or lines on one sheet of substrate. In such an apparatus the DEP device can be used to print fine tuned gray levels (e.g. pictures, photographs, medical images etc. that contain fine gray levels) and the classical electrographic device can be used to print alphanumeric symbols, line work etc. that do not need the fine tuning of gray levels.

MEASURING METHODS

TEST A: RATIO APPARENT DENSITY OVER REAL DENSITY

The real density ($\rho_{real}$) of the toner particles was measured in accordance with conventional techniques in an apparatus such as the BECKMANN AIR COMPARIMETER (trade name), available from Beckmann Instruments, Chemin des Boutdon nr. 52–54, 93220 Gagny, France.

The apparent density ($\rho_{app}$) of the toner particles was determined according to the following procedure: 50 g of the mixture of the toner particles and 0.5% by weight of fumed hydrophobic silica having a specific surface area of 260

$m^2/g$ was weighed and introduced in a graduated glass cylinder with diameter of 35 mm. The cylinder was placed on top of a "tapping" device, STAV 2003, STAMPFVOLUMETER (trade name) available from JEL, J. Engelmann A. G., Ludwigshafen, Germany. This apparatus taps at a rate of 250 cycles pro minute. The mixture of toner particles and hydrophobic silica was tapped for 2000 cycles. Afterwards the volume was read in $cm^3$ ($\times cm^3$ for 50 g of mixture) and $\rho_{app}$ calculated as $$\rho_{app} = \frac{50 \text{ g}}{\times \text{ cm}^3}$$

TEST B: SPHEROIDICITY

The spheroidicity was determined by the ratio of the length of the long axis of the projected microscopic image of the particles to the length of the short axis. The toner particles were therefore photographed under an optical microscope and the long and short axis (both axis crossing the center of gravity of the shadow image of the particle) and the ratio of the length of both axis (i.e. the spheroidicity) were determined for at least 20 particles. From these twenty measurements, an average spheroidicity is calculated. The accuracy of said average spheroidicity was better than 0.02

EXAMPLES

PREPARATION EXAMPLE 1: COMPARATIVE EXAMPLE

The toner resin selected was a very low molecular weight polyester material exhibiting a highly glassy behaviour and being very brittle. The polyester was a polycondensate of propoxylated bisphenol A and fumaric acid, commercially available as ATLAC T500 (ATLAC is a registered trade name of Atlas Chemical Industries Inc. Wilmington, Del. U.S.A.)

The toner was prepared by melthomogenisation of 97 parts by weight of said polymer with 3 parts of a copper phthalocyanine pigment, HELIOGENBLAU (tradename) obtainable from BASF, Germany. The melthomogenisation was done in a melt homogenisation kneader for 30 minutes at 120° C. Afterwards the mixture was cooled down and milled with an Alpine Fliessbeth-Gegenstrahlmühle (A.G.F.) type 100 as milling means and the Alpine Multiplex Zick-Zack Sichter as air classification means, available from Alpine Process Technology, Ltd., Rivington Road, Whitehouse, Industrial Estate, Runcorn, Cheshire, UK.

The particle size distribution had a $d_{n,50}$ (numerical average diameter) of 6.5 μm and a $d_{v,50}$ (volume average diameter) of 8.5 μm, when measured with a COULTER COUNTER (registered trade mark) Model TA II particle size analyzer operating according to the principles of electrolyt displacement in narrow aperture and marketed by COULTER ELECTRONICS Corp. Northwell Drive, Luton, Bedfordshire, LC 33, UK.

This was toner 1.

The toner powder was mixed with 0.5% by weight with respect to the toner particles of hydrophobic silica particles with BET surface of 260 $m^2/g$ (AEROSIL R812 trade mark of DEGUSSA, Germany). The ratio $\rho_{app}/\rho_{real}$ was measured according to TEST A, the spheroidicity was measured according to TEST B. BET was measured by a method described by Nelsen and Eggertsen in "Determination of Surface Area Adsorption measurements by continuous Flow Method", Analytical Chemistry, Vol. 30, No. 9 (1958) p. 1387–1390. The values are found in table 2.

The powder was used to create a developer by mixing it with coated ferrite carrier particles at 5% w/w (by weight) with respect to the coated ferrite carrier particles. Said developer was used in a DEP-process. (see printing example)

PREPARATION EXAMPLE 2

Example 1 was repeated with the exception however that a high molecular weight polyester was used, showing no brittle milling behaviour and prepared by the polycondensation of 65 mol % of terephthalic acid, 35 mol % of isophthalic acid, 40 mol % of diethoxylated bisphenol A and 60 mol % of ethylene glycol. This resin, probably due to its more aromatic character (compared to the resin of example 1), shows other fraction mechanics. As a consequence of these fraction mechanics the resin particles are, after milling, less irregular and the fracture planes are less jagged.

This was toner 2, having a particle size distribution with a $d_{n,50}$ (numerical average diameter) of 6.4 μm and a $d_{v,50}$ (volume average diameter) of 8.4 μm, when measured with a COULTER COUNTER (registered trade mark) Model TA II.

The toner powder was mixed with 0.5% by weight with respect to the toner particles of hydrophobic silica particles with BET surface of 260 $m^2/g$ (AEROSIL R812 trade mark of DEGUSSA, Germany). The ratio $\rho_{app}/\rho_{real}$, the spheroidicity and the BET were measured as in example 1.

The values are found in table 2.

The powder was used to create a developer by mixing it with coated ferrite carrier particles at 5% w/w (by weight) with respect to the coated ferrite carrier particles. Said developer was used in a DEP-process. (see printing example)

PREPARATION EXAMPLE 3 and 4

Particles were prepared from the particles prepared in the example 2 using those particles as starting material for a surface and shape modification process. Use was made of the powder surface modification technology offered in the HYBRIDIZATION SYSTEMS (tradename) sold by the Nara Machinery co., Tokyo Japan The equipment used as the NSH-1 (tradename) model, a clear desciption of the possibilities of said system being referred at in the commercially available data brochures published by said company. Essentially this system enables a powder to be fed to a mixing chamber in which a highly efficient dispersion is realised in the gaseous phase and wherein a high mechanical/thermal energy can be transmitted to the dispersed particles by mechanical impaction and shearing forces from a rotor rotating at high speed and impacting the particles. The powder/gas mixture is escaping centrifugally from the chamber but is recirculated to the center of the chamber by a cooled pipe, a repetitive process is hence possible. Also the rotor is cooled.

An efficient dispersion and cooling prevent the particles to agglomerate, but is not preventing the particles to be rounded by this applied energy. By changing the conditions a semi-rounded particle (potatoe like particle) up to a perfect round particle can be created from a starting non spherical particle.

The preparation of TONER 3 proceeded as follows. NHS-1 (tradename) device was fed with 70 g of the toner particles of example 2, where upon the particle was subjected to the energy transmitted by the rotor rotating at 8000 rpm for 5 min. The system was permanently cooled with 20°

C. water. Afterwards the powder was recovered. During the preparation the temperature shifted from room temperature to 53° C. Toner 3 had a particle size distribution with a $d_{n,50}$ (numerical average diameter) of 6.5 μm and a $d_{v,50}$ (volume average diameter) of 8.5 μm, when measured with a COULTER COUNTER (registered trade mark) Model TA II.

The toner powder was mixed with 0.5% by weight with respect to the toner particles of hydrophobic silica particles with BET surface of 260 $m^2/g$ (AEROSIL R812 trade mark of DEGUSSA, Germany). The ratio $\rho_{app}/\rho_{real}$, the spheroidicity and the BET were measured as in example 1.

The values are found in table 2.

The powder was used to create a developer by mixing it with coated ferrite carrier particles at 5% w/w (by weight) with respect to the coated ferrite carrier particles. Said developer was used in a DEP-process. (see printing example)

The preparation of TONER 4 was a repetition of the preparation of toner 3, but the treatement was prolonged for 15 minutes and the final temperature was 55° C.

Toner 4 had a particle size distribution with a $d_{n,50}$ (numerical average diameter) of 6.5 μm and a $d_{v,50}$ (volume average diameter) of 8.5 μm, when measured with a COULTER COUNTER (registered trade mark) Model TA II.

The toner powder was mixed with 0.5% by weight with respect to the toner particles of hydrophobic silica particles with BET surface of 260 $m^2/g$ (AEROSIL R812 trade mark of DEGUSSA, Germany).

The ratio $\rho_{app}/\rho_{real}$, the spheroidicity and the BET were measured as in example 1.

The values are found in table 2.

The powder was used to create a developer by mixing it with coated ferrite carrier particles at 5% w/w (by weight) with respect to the coated ferrite carrier particles. Said developer was used in a DEP-process. (see printing example)

PRINTING EXAMPLE

Direct electrostatic prints were made using developers comprising toner 1, toner 2, toner 3 and toner 4 respectively. The developers were brought into a magnetic brush assembly.

A printhead structure was made from a polyimide film of 100 μm thickness, double sided coated with a 15 μm thick copperfilm. The printhead structure had one continuous electrode surface opposed to the toner delivering means, and a complex addressable electrode structure facing the receptor surface. No third electrode was used in this particular example. The addressable electrode structure was made by conventonial techniques used in the micro-electronics industry, and using fotoresist material, film exposure, and subsequent etching techniques. No surface coatings were used in this particular example. The apertures were 100 μm in diameter, being surrounded by a circular electrode structure in the form of a ring with a width of 225 μm measured radialy from the edge of the 100 μm apertures. The apertures were staggered in such a way as to obtain a pitch of 100 μm, giving an overall addressability of the image of 250 dpi. The cirular electrodes could be changed in their potential individually, whereas other elements (back electrode, shield electrode, toner delivery means) were connected to one electrical potential for their whole corresponding structure. For the example all circular electrodes were kept at the same potential.

The toner delivery means was a stationary core/rotating sleeve type magnetic brush as described below.

The development assembly comprised two mixing rods used to transport the developer through the unit and to mix toner with developer and one metering roller.

The magnetic brush assembly was constituted of the so called magnetic roller, which in this case contained inside the roller assembly a stationary magnetic core, showing 9 magnetic poles of 500 Gauss magnetic field intensity and with an open position to enable used developer to fall off from the magnetic roller. The magnetic roller contained also a sleeve, fitting around said stationary magnetic core, and giving to the magnetic brush assembly an overall diameter of 20 mm. The sleeve was made of stainless steel roughened with a fine grain to assist in transport (<50 μm). A scraper blade was used to force developer to leave the magnetic roller. And on the other side a doctoring blade is used to meter a small amount of developer onto the surface of said magnetic brush assembly. The sleeve was rotating at 100 rpm, the internal elements rotating at such a speed as to conform to a good internal transport within the development unit.

The distance, 1, between the front side of the printhead structure and the sleeve of the magnetic brush assembly, was set at 450 μm. The distance between back electrode and back side of the printhead (i.e. control electrodes) was set to 150 μm and the paper travelled at 1 cm/sec. The back electrode was connected to a power supply of 400 V (V4 in FIG. 1). The sleeve of the magnetic brush (V1 in FIG. 1) was connected to an AC power supply with a square wave oscillating field of 600 V 3.0 kHz with 0 V De-offset. The shield electrode was grounded (V2 in FIG. 1). To the individual control electrodes a voltage of 0 V (V3 in FIG. 1) was applied during 2 seconds, followed by a DC voltage of −300 V for an other 3 seconds.

Printing proceeded for 90 minutes and the clogging was apparent when in an even blue print a white stripe was seen, meaning the total clogging of at least one aperture. After 90 minutes, the printing apertures were examined microscopically and a degree of clogging determined as the average percentage of the surface of all the aperture still free of toner particles. This was done for the four developers, comprising the four toners of the preparation examples. The results are to be found in table 2.

TABLE 2

| Toner | Spher* | $\rho_{app}/\rho_{real}$ | Ratio BET** | Clogging+ | Clogging++ |
|---|---|---|---|---|---|
| Toner 1 | 1.45 | 0.51 | 2.8 | 13 | 0 |
| Compar. Toner 2 | 1.40 | 0.54 | 2.5 | 90 | 75 |
| Toner 3 | 1.29 | 0.59 | 1.30 | >90 | 90 |
| Toner 4 | 1.06 | 0.61 | <1.02 | >90 | 97 |

*: spheroidicity according to test B
**: ratio between measured BET ($BET_{meas}$) to calculated BET ($BET_{calc}$)
+: minutes printing without clogging
++: the percentage of the surface of the apertures still free of toner particles It is clear that a DEP device using toner 3 or 4 can operate for more than one and an half hour without cleaning. This means that an eventual cleaning operation has only to be operated sporadically. The performance of a DEP device using toner 2 could be enhanced to the level of a device using toner 3 or 4 by the insertion of a short cleaning cycle, after each continuously printed DIN A4 page. A well working cleaning procedure in a DEP device using toner 2 consisted in adding a 1 sec. cleaning time after each continuously printed DIN A4 page and before starting the printing of the next DIN A4 page. For the cleaning, in a DEP device using toner 2, the DC-offset on the sleeve of the magnetic brush (V1) was changed fron 0 to +200 V and the amplitude of the AC-voltage was lowered to 100 V from 600 V. A DEP device using toner 1 necessitated the use of more complicated cleaning steps and procedures as described earlier, in order to obtain long time printing stability.

We claim:

1. A method for direct electrostatographic printing (DEP) on an intermediate substrate or on a final substrate, using a device that comprises a back electrode, a printhead structure comprising a control electrode in combination with apertures, and a toner delivery means for presenting a cloud of dry toner particles in the vicinity of said apertures, wherein (i) said toner particles are such that the ratio of the length of the long axis of the projected microscopic image of said particles to the length of the short axis is between 1.00 and 1.40, said ratio being the average of the ratios measured on at least 20 different toner particles (ii) said toner particles after addition of 0.5% by weight of fumed hydrophobic silica having a specific surface area of 260 $m^2/g$ show a ratio of apparent density ($\rho_{app}$) over real density ($\rho_{real}$)

$$\frac{\rho_{app}}{\rho_{real}} > 0.52$$

(iii) said toner particles having a ratio between measured BET ($BET_{meas}$) and calculated BET ($BET_{calc}$) of $$1.00 \leqq \frac{BET_{meas}}{BET_{calc}} \leqq 2.00$$

2. A method according to claim 1, wherein said ratio of the length of the long axis of the projected microscopic image of said particles to the length of the short axis is between 1.00 and 1.30.

3. A method according to claims 1, wherein said ratio of apparent density ($\rho_{app}$) over real density ($\rho_{real}$), is greater than 0.55.

4. A method according to claim 1, wherein said ratio fulfils the equation $$1.00 \leqq \frac{BET_{meas}}{BET_{calc}} \leqq 1.50$$

5. A method according to claim 1, wherein said toner particles have an average charge per volume diameter (q/d) wherein 1 fC/10 $\mu m \leqq |q/d| \leqq 20$ fC/10 μm.

6. A method according to claim 1, wherein said toner particles have a charge distribution with a coefficient of variability, v, lower than 0.50.

7. A method according to claim 1, wherein the volume average diameter of the toner particles is between 3 and 20 μm and the volume particles size distribution of said toner particles is basically gaussian with a coefficient of variability, v, lower than 0.50.

* * * * *